C. E. PRICKETT.
GAME APPARATUS.
APPLICATION FILED JULY 11, 1908.

976,492.

Patented Nov. 22, 1910.

Inventor
Clinton E. Prickett

UNITED STATES PATENT OFFICE.

CLINTON E. PRICKETT, OF ALLEGHENY, PENNSYLVANIA, ASSIGNOR OF ONE-HALF TO ROY D. COOL, OF ALLEGHENY, PENNSYLVANIA.

GAME APPARATUS.

976,492.      Specification of Letters Patent.      Patented Nov. 22, 1910.

Application filed July 11, 1908. Serial No. 443,033.

*To all whom it may concern:*

Be it known that I, CLINTON E. PRICKETT, citizen of the United States, residing at Allegheny, in the county of Allegheny and State of Pennsylvania, have invented certain new and useful Improvements in Game Apparatus, of which the following is a specification.

The present invention provides a device adapted for both amusement and instruction, whereby one may become acquainted with facts which by reason of association, are not easily forgotten. The device is of such construction as to be applied in a number of ways and adapted to impart instruction or information according to the subject or topic desired.

The apparatus comprises a map or chart, and a pointer adapted to turn about an axis and register with any one of a series of pins, the latter being numbered to correspond with the different subdivisions on the map and adapted to receive perforated tabs or slips bearing numbers indicating the area or population of the different subdivisions on said map, the player having the tab or slip indicating the largest area or population after a given number of turns of the pointer being declared the winner.

Figure 1:
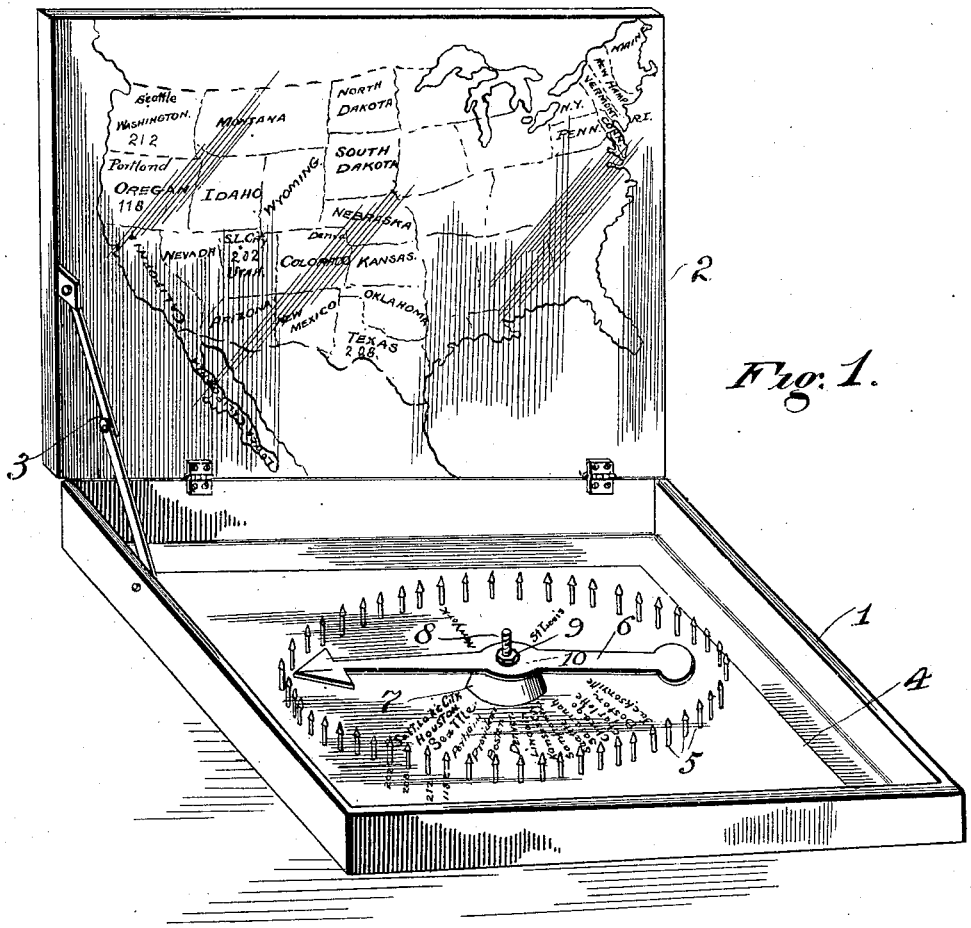
Figure 2:
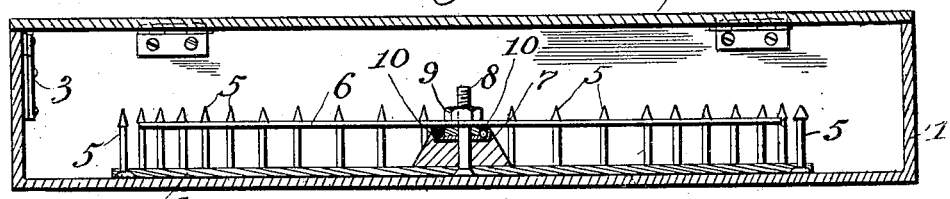
Figure 3:

While the invention may be adapted to different forms and conditions by changes in construction and minor details without departing from the spirit of the invention or essential features thereof, still the preferred arrangement is shown in the accompanying drawings, in which:

Figure 1 is a perspective view of a game apparatus embodying the present invention. Fig. 2 is a sectional view thereof with the lid or cover in closed position. Fig. 3 is a detailed view of some of the tabs or slips.

Corresponding and like parts are referred to in the following description and indicated in all views of the accompanying drawings, by the same reference characters.

The apparatus comprises a shallow bowl, preferably of rectangular formation, and closed by a cover 2 hinged to a side thereof, said cover being held at about a right angle by means of hinged members 3. Upon the inner side of the cover appears a map or chart which may be printed directly thereon or printed upon paper or like material and subsequently pasted or otherwise secured to said cover. The map or chart may represent the subdivisions of any country or place according to the nature of the game to be played and the instruction to be imparted. A base 4 is located within the box and may be secured to the bottom thereof or not as desired. A plurality of pins 5 project upwardly from the base and are arranged in a circle, each pin being numbered to indicate a subdivision on the map and having printed on the face opposite each pin, the name of the principal city or capital of said subdivision. The pins 5 are passed through the base so that their heads are confined between the base and the bottom of the box. The number of pins is immaterial and depends upon the character of the game. The numerals may appear at one side of the pins and correspond to the numerals on the map indicating the different States or subdivisions thereof, and the names of the cities may appear upon the same side of the pins as the numbers, or upon the opposite side. The names may indicate States, capitals, principal cities or the like, as before stated.

A pointer 6 is mounted upon the base 4 and is elevated therefrom a short distance, a stand 7 being interposed between the pointer and the base. The stand 7 consists of a tapered block and a bolt 8 is passed through the base, stand and pointer and constitutes an axis for the latter to turn about. A nut 9 mounted upon the threaded end of the bolt 8 secures the pointer against accidental displacement. Balls 10 or like anti-friction devices are interposed between the pointer itself and stand 7 to insure free movement of the pointer with a minimum of resistance.

A series of tabs or slips 11 are provided, each having an opening 12 near one end thereof to receive one of the pins 5. Each of the tabs or slips is stamped, printed or otherwise provided with the name of the capital or principal city of one of the subdivisions on the map and numerals indicating the population and area of said city.

After a player has spun or rotated the pointer 6 and the same has come to rest, the player glances at the number of the pin opposite the arrow head of the pointer, and consults the map to find the State indicated by a corresponding number on said map. Say, for instance, the number of the pin opposite the pointer when spun by a player represents Texas, the player by glancing at the printed matter on the base opposite said pin will know that Houston is in the State of Texas, and in this manner become familiar with the principal cities of the several States. The player, after determining this fact, selects the tab having the name Houston printed thereon and places the tab on said pin, and the numerals printed on said tab or slip, indicating the population or area of that city, is credited to him. Each player in turn follows the same plan, namely, spins the pointer, selects the tab or slip corresponding to the name on the base opposite the pin at which the pointer stops, places the tab on the pin and writes down the number appearing on said tab. After the players have had a number of rounds or turns, the several numbers are added and the player having the highest number is declared the winner.

The game may be utilized to familiarize one with the names of States, capitals and principal cities thereof, the area, population and electoral votes, etc. The data appearing upon the map or chart or upon the circle and tabs or slips may vary according to the special purpose or intent of the game and the instruction to be derived therefrom.

Having thus described my invention, what I claim as new, is:

1. A game apparatus comprising a map having subdivisions, each represented by a numeral, a base provided with a row of pins arranged in a circle, said base having represented thereon opposite each pin a number corresponding to the number of one of the subdivisions on the map and the name of the principal city of said subdivision, a pointer mounted for rotation on the base and adapted to register with the pins, and a series of tabs provided with perforations adapted to receive the pins, said tabs having the names of the principal cities of the subdivisions represented thereon and the population of said cities.

2. A game apparatus comprising a box having a pivoted lid, a map mounted on the lid and having subdivisions, each represented by a numeral, a base placed upon the bottom of the box, pins passing through the base and arranged in a circle and having their heads confined between the base and the bottom of the box, said base having represented thereon opposite each pin a number corresponding to the number of one of the subdivisions on the map and the name of the principal city of said subdivision, a pointer mounted for rotation on the base and adapted to register with the pins, and a series of tabs provided with perforations adapted to receive the pins, said tabs having the names of the principal cities of the subdivisions represented thereon and the population of said cities.

In testimony whereof I affix my signature in presence of two witnesses.

CLINTON E. PRICKETT. [L. S.]

Witnesses:
W. J. BECKFIELD, Jr.,
AGNES MARTIN.